United States Patent
Lefebvre et al.

(10) Patent No.: US 11,089,456 B2
(45) Date of Patent: Aug. 10, 2021

(54) SYSTEM FOR SUGGESTING, LAUNCHING AND AUTOMATICALLY OR SEMI-AUTOMATICALLY DOWN-LOADING APPLICATIONS FOR AN INTELLIGENT MOBILE OBJECT

(71) Applicant: WORLDLINE, Bezons (FR)

(72) Inventors: Guillaume Lefebvre, Meurchin (FR); Nicolas Kozakiewicz, Velizy (FR); Francois-Julien Ritaine, Thumeries (FR)

(73) Assignee: WORLDLINE, Bezons (FR)

( * ) Notice: Subject to any disclaimer, the term of this patent is extended or adjusted under 35 U.S.C. 154(b) by 547 days.

(21) Appl. No.: 16/066,042

(22) PCT Filed: Dec. 22, 2016

(86) PCT No.: PCT/EP2016/082453
§ 371 (c)(1),
(2) Date: Jun. 25, 2018

(87) PCT Pub. No.: WO2017/109115
PCT Pub. Date: Jun. 29, 2017

(65) Prior Publication Data
US 2020/0267236 A1  Aug. 20, 2020

(30) Foreign Application Priority Data
Dec. 24, 2015 (FR) ...................... 1563315

(51) Int. Cl.
*H04W 4/60* (2018.01)
*H04W 4/80* (2018.01)
*H04W 4/029* (2018.01)
*G06F 16/9535* (2019.01)
(Continued)

(52) U.S. Cl.
CPC ............... *H04W 4/60* (2018.02); *G06F 8/61* (2013.01); *G06F 16/9535* (2019.01);
(Continued)

(58) Field of Classification Search
CPC ......... H04W 4/60; H04W 4/029; H04W 4/80; H04W 12/0023; H04W 4/02;
(Continued)

(56) References Cited

U.S. PATENT DOCUMENTS 8,745,617 B1* 6/2014 Stekkelpak ............... G06F 8/61
717/178
8,904,274 B2 12/2014 Gnanasambandam et al.
(Continued)

FOREIGN PATENT DOCUMENTS

EP    WP2706730    3/2014
EP    2 755 118    7/2014
WO    WO 2010/075174    7/2010

OTHER PUBLICATIONS

International Search Report dated Mar. 15, 2017 from corresponding application No. PCT/EP2016/082453.

*Primary Examiner* — Patrice L Winder
(74) *Attorney, Agent, or Firm* — Hauptman Ham, LLP

(57) ABSTRACT

A system using a server including a server application AS having at least a database containing third-party applications to be suggested and a hardware and software communication arrangement for automatically or semi-automatically down-loading at least one application selected from the database to an intelligent and mobile communicating IT object OMI including a client application ACOMI installed on the intelligent, mobile IT object using rules R that can evolve or be modified.

17 Claims, 2 Drawing Sheets

(51) Int. Cl.
*G06F 8/61* (2018.01)
*H04L 29/08* (2006.01)

(52) U.S. Cl.
CPC .............. *H04L 67/20* (2013.01); *H04L 67/34* (2013.01); *H04W 4/029* (2018.02); *H04W 4/80* (2018.02)

(58) Field of Classification Search
CPC ...... H04W 12/35; G06F 16/9535; G06F 8/61; G06F 8/60; H04L 67/20; H04L 67/34
See application file for complete search history.

(56) References Cited

U.S. PATENT DOCUMENTS

| | | | | |
|---|---|---|---|---|
| 9,021,429 | B1* | 4/2015 | Agrawal | G06F 8/60 717/114 |
| 9,280,789 | B2* | 3/2016 | Kirkham | G06F 8/61 |
| 9,516,467 | B1* | 12/2016 | Cronin | G06Q 30/0261 |
| 9,936,333 | B2* | 4/2018 | Lau | H04W 4/60 |
| 9,973,565 | B2* | 5/2018 | Stone | G06Q 30/02 |
| 9,998,867 | B2* | 6/2018 | Keithley | H04W 4/33 |
| 10,409,576 | B2* | 9/2019 | O'Sullivan | G06F 8/71 |
| 2012/0021770 | A1 | 1/2012 | Naqvi | |
| 2013/0326499 | A1* | 12/2013 | Mowatt | G06F 8/60 717/177 |
| 2014/0120961 | A1* | 5/2014 | Buck | H04W 4/12 455/466 |
| 2014/0194146 | A1 | 7/2014 | Yarvis | |
| 2015/0347912 | A1* | 12/2015 | Rodzevski | G01P 15/02 706/11 |
| 2018/0032997 | A1* | 2/2018 | Gordon | G06Q 30/0269 |

\* cited by examiner

SYSTEM FOR SUGGESTING, LAUNCHING AND AUTOMATICALLY OR SEMI-AUTOMATICALLY DOWN-LOADING APPLICATIONS FOR AN INTELLIGENT MOBILE OBJECT

RELATED APPLICATIONS

The present application is a National Phase of International Application Number PCT/EP2016/082453, filed Dec. 22, 2016, and claims the priority of France Application No. 1563315, filed Dec. 24, 2015.

TECHNICAL FIELD OF THE INVENTION

The invention relates to the field of systems for automatic or semi-automatic downloading of applications, in particular intended to be used on an intelligent mobile object (OMI) such as: a telephone, a tablet, a portable computer, a wearable computer, a connected watch, a server, a connected object, etc.

The invention proposes a method from the creator of the application to the end user and a system, to propagate, distribute and provide the relevant data and/or the application anywhere, at the time it is useful, whatever the means of communication, with few or no actions from the end user, in a secure way, without putting at risk the private context information of an OMI reception device, and ensuring real-time service with added value and which is securely confidential for the end user.

PRIOR ART

It can be observed that the number of applications available for intelligent mobile objects such as telephones, tablets, or portable computers is ever increasing. It is therefore becoming difficult for a user to find an application meeting his needs, particularly when his needs vary over time and according to his environment.

The document EP2706730 discloses a method for suggesting applications implemented by a terminal, wherein a data structure including identifiers allows a server to select a third-party application to be suggested so that the user downloads it onto his terminal. Thus this type of method constantly requires a connection between the terminal and the server. Furthermore, the suggestion is made by the server, which sends a link to the terminal, and not the client application located on the terminal, which can cause problems when the server is not responding or is not accessible. Moreover, there is no information in this document concerning the reasons for the choice of the suggestion of such or such an application, and even less considering an environmental context to suggest a specific application.

The document U.S. Pat. No. 8,904,274 discloses a method for suggesting the launch of third-party applications by a first client application. The suggestion is based on information provided by the user on a second client application. Furthermore, the suggestion is directed to the third-party applications previously installed on the device and accessible to the first client application. There is no suggestion of installation of new third-party applications.

Thus there exists a need for a system comprising a client application and a server application, suggesting, according to the specific case, the launching, or the installation then the launching, of a third-party application according to its environment, said system remaining operational when the server application is not available, or not accessible, and offering modularity in its operation.

SUMMARY OF THE INVENTION

This aim of the invention is thus to propose a system of for suggesting, launching and automatically or semi-automatically downloading applications an intelligent mobile object (OMI), making it possible to palliate at least a part of the drawbacks of the prior art, by proposing a system that will determine the needs of the user and suggest an application to him according to an environmental context.

For this purpose, the invention concerns a system using a server comprising at least a database containing third-party applications to be suggested or links thereto, and a hardware and software communication arrangement for automatically or semi-automatically downloading at least one application selected from the database to an intelligent and mobile communicating IT object OMI including a client application ACOMI (2) installed on the intelligent mobile object using rules R that can evolve or be modified, to process them by an appropriate engine of the client application ACOMI (2) and arrive, by the use of contextual data coming from at least one sensor of the intelligent mobile IT object OMI, at the recommendation of an application to be downloaded determined by the use of contextual information, contextual data defining a profile P and/or a context C, the client application ACOMI (2) automatically or semi-automatically triggering the remote or proximity downloading, and/or the automatic launching, of the recommended application by the use of a connection with the remote IT object according to the availabilities of the networks in proximity to the intelligent, mobile communicating IT object OMI and the preferred connection parameters previously stored by the user, either in the server or in the intelligent mobile IT object OMI, and/or comprising parameters defining the security level of the connection.

Advantageously, the context C is formed at least by data relating to the geolocation coordinates, the presence of networks, the date and the time in combination with data coming from at least one of the following sensors:
  an image sensor,
  an audio sensor,
  a pressure sensor,
  a biological data sensor,
  a brightness sensor,
  a motion sensor,
  an environmental sensor,
  a proximity sensor
or at least one desire indicated by the user.

According to a particularity, the processing of the context information sent by each intelligent, mobile communicating IT object OMI allows the elaboration of rules R that can evolve or be modified, each rule making it possible to contribute to the recommendation of an application to be recommended among the applications of the database according to the data coming from the context C.

Advantageously, the elaboration is carried out on the intelligent, mobile communicating IT object OMI.

According to a particularity, the rules for sensing context are updated in the application ACOMI of the mobile from the application AS of the server by sending messages, and can therefore evolve.

According to another particularity, the elaboration is carried out on the server.

Another subject of the present application is an intelligent, mobile communicating IT object OMI for use in a system according to the invention, characterized in that in the event of the user choosing automatic downloading and after generation by the intelligent, mobile communicating IT object OMI of the suggestion, the client application ACOMI (2), after verifying the condition, sends an acceptance message to the server AS containing the recommended application and the downloading is initialized and carried out by the server, According to a particularity, in the event of the user choosing semi-automatic downloading, after generation of the suggestion by the intelligent, mobile communicating IT object OMI, the client application ACOMI (2), after reading the condition, diverts its program to a sequence causing the display of a window, icon, notification or box asking the user to agree to the downloading. The user selects a reply on his intelligent, mobile communicating IT object OMI by means of a human-machine interface, and the client application ACOMI (2) of the intelligent, mobile communicating IT object OMI, according to the reply, generates the message adapted to the reply to send it to the server AS containing the recommended application and which reacts in accordance with the reply by sending or not sending the suggested application to the telephone of the user.

According to another particularity, the client application ACOMI (2) comprises a parameterization mechanism allowing the user, on starting the client application ACOMI (2) or by accessing the menu of the application, to choose and activate the network or the type of communication usable to communicate with the server or another intelligent, mobile communicating IT object OMI to carry out a crossing of data.

The term "data crossing" is understood to mean any unidirectional or multidirectional exchange of data between at least two client application ACOMI or a client application ACOMI and the server application AS, which may relate to data coming from the profiles P, the contexts C, the rules R and/or third-party applications and in general any data usable by the system. This includes, but is not limited to considering the server AS of the profile and/or the contexts C and/or the rules R of the user in order to refine its general rules, considering the server AS of new rules or improved rules from the application providers.

Advantageously, the client application ACOMI (2) comprises a parameterization mechanism allowing the user, on starting the client application ACOMI (2), to choose the security level required to communicate with the server or another intelligent, mobile communicating IT object OMI to carry out a data crossing.

According to a particularity, the client application ACOMI (2) comprises a parameterization mechanism allowing the user, on starting the client application ACOMI (2), or by accessing the menu of the application, to choose a condition of automatic or semi-automatic downloading or of crossing and its storage in the memory of the application.

According to another particularity, the information collected and forming the context C is emitted, directly or after processing, from different sources such as: either at least one motion sensor, or at least one environment sensor, or at least one mobile network subsystem, or at least one WLAN subsystem, or at least one PAN subsystem, or at least one LAN subsystem, or at least one of the following networks: a GSM, WiFi, Bluetooth, NFC, radio, LIFI or Ethernet network, or a mixture or an extrapolation of one or more of these sources above.

Advantageously, the environment sensor generating the information collected and forming the context C is formed at least by:

motion sensors such as an accelerometer, a gyroscope, a magnetometer, an inclinometer, and/or environment sensors such as a humidity or temperature sensor, and/or proximity sensors such as a radar or sonar, and/or sensors of position such as GPS/GALILEO, of geolocation, geofencing, detection of the proximity of an object of WiFi, or Bluetooth, or Beacon or NFC or RFID, and/or GSM, WiFi, LIFI, Bluetooth, Beacon, NFC, WLAN, PAN network sensors and/or sensors of biological constants such as heart rate, arterial pressure, oximetry, and/or brightness sensors, and/or touch-sensitive or physical pressure sensors, such as a touch-sensitive area, a keyboard, and/or imaging sensors such as a video camera, a camera and/or audio sensors such as a mic, and/or time-based sensors such as a clock, a calendar and/or any other sensors present on an OMI, and/or a mixture or an extrapolation of one or more of the elements above or any other information received from at least one sensor.

According to a particularity, the information collected and forming the context C is associated with a Profile P containing data representing the preferences of the user, or his trends, along with data coming from other context sources such as the calendar or connected objects.

According to another particularity, the client application ACOMI (2) includes a parameterization menu allowing the user to choose one or more types of application categories or one or more types of specific applications that he accepts or refuses, completely or partially, by selecting an acceptance or refusal reply in the display of categories, for at least one of the following categories: games, utilities, social, transport, bargains, payment.

According to another particularity, the downloading or crossing each implements a procedure of pairing, selecting of the connection type, authentication according to an authentication level determined by the user during parameterization and transfer according to the security level chosen.

According to a particularity, when the reply following a message sent to the server is not available, the communication module sets up a connection with at least a second local intelligent, mobile communicating IT object OMI2 comprising the client application and the third-party application corresponding to the environmental context, in order to download and then launch said third-party application.

According to another particularity, the information collected and forming the context C is associated with a unique identifier creating a bijection between the context and the user or the mobile.

BRIEF DESCRIPTION OF THE FIGURES

Other features, details and advantages of the invention will become apparent on reading the following description with reference to the appended figures.

DETAILED DESCRIPTION OF VARIOUS EMBODIMENTS OF THE INVENTION

Many combinations may be envisioned without departing from the scope of the invention; those skilled in the art will choose one or the other according to the economic, ergonomic, dimensional or other constraints that he must observe.

The underlying idea behind the present invention is to obtain "the right application at the right time".

The searching for, installing and launching of an application are conventionally considered as three very different steps, requiring at each step a deliberate action from the user.

But, if the pre-requisites are met, a user should not have to be concerned with these different steps. In particular, the user should not have to worry about finding the correct application, just as he may be unaware that an application of this type exists.

To do this, the subject of the present application is a system (1) comprising a client application ACOMI (2) intended to be executed by a intelligent, mobile communicating IT object (OICMI, abbreviated to OMI in the remainder of the text) such as a telephone, a tablet, a portable computer, a server or a connected object and a server application AS (3) intended to be executed on a computer server or one on another OICMI.

Preferably, the computer server executing the AS is a server connected to the Internet (4) by various means of communication such as: Ethernet, GSM, Bluetooth, WiFi, radio.

Figure 1A:
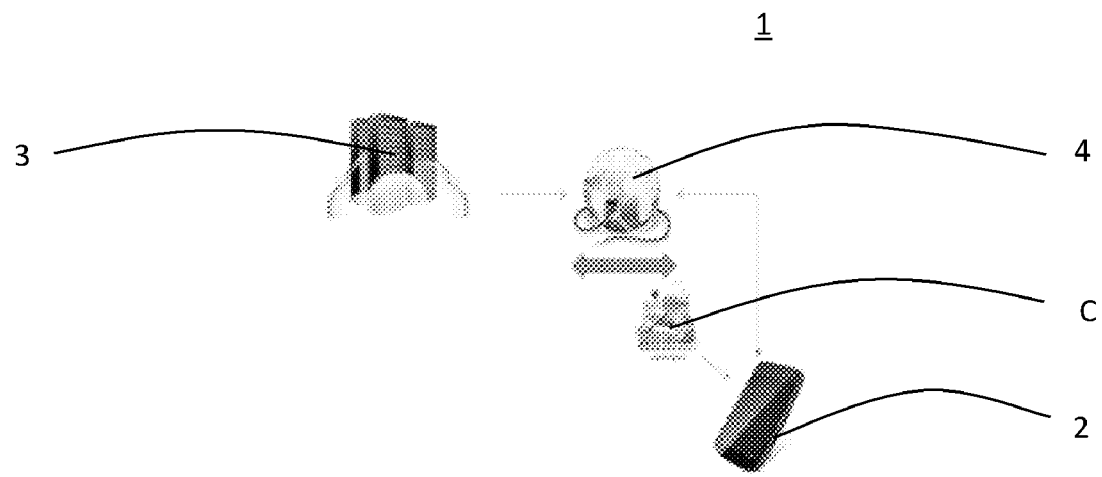
FIG. 1, represents the system according to the invention in a first operating mode when the client application ACOMI (2) can communicate directly with the server application AS (3) on a remote server by means of different connection modes.
FIG. 1b represents a menu of the system according to the invention wherein are presented the different modes of connection to the remote server.

As illustrated in FIG. 1a, the client application ACOMI (2) and the server application AS (3) are capable of communicating with one another: either over the Internet (4), or by means of various communication networks such as GSM, Bluetooth, WiFi, radio.

Figure 1B:
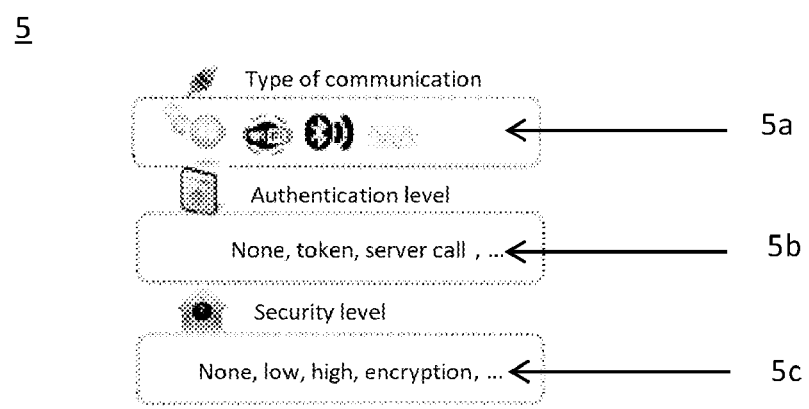

The client application ACOMI (2) therefore includes a program module capable of searching for the most appropriate communication network given the location of the client application, then using this communication by implementing the security level chosen by the user in the menu (5) of the application ACOMI, illustrated by FIG. 1b, which allows him to choose for each means of communication (5a), the appropriate level of authentication (5b) and security (5c). The authentication level is chosen from among the following: none, token, server call, etc. The security level is chosen from among the following: none, low, high, encryption etc.

Thus for each means of communication, the user will be able to define on the application ACOMI the minimum level of authentication desired and the minimum security desired, by selecting an icon displayed on the screen corresponding to each of the possibilities offered for each sub-menu, then storing a triplet in the memory. Once this operation has been performed at the configuration of the application ACOMI or subsequently during a configuration modification, the application will store the triplets (means of communication, authentication level, security level) in the memory and the application will use these items of information to set up the communication, by the locally available means of communication, and applying thereto the authentication and security requirements accepted by the user. It will thus be understood that the system offers great flexibility in the choice of means of communication and in the security applied. The menu of the application ACOMI also contains network, authentication and security options, a pairing option which, when this option is selected by the user, allows him to choose from the sub-menu one or more option(s) from among the following pairing options: NFC, Bluetooth, WiFi, QR code, voice, code, and associate security functionality with each communication option, by going into the authentication or security menu. Again, the application will store the chosen doublets or triplets in the memory and before each pairing will search the memory for the rules to be applied for the operation.

When the user selects on the screen the means of communication usable for the client application ACOMI (2), the latter generates in the memory a file classifying the means of communication by an order of priority defined by the client application, the server application or the user himself. Once this operation has been carried out, when the client application ACOMI (2) must set up a connection, the latter is set up based on the means of communication available and their priority. In the same way, when the user defines the security and authentication levels, the client application ACOMI (2) generates in the memory a file classifying the security and authentication levels based on the means of communication available, in order to put in place a connection according to the desires of the user, while remaining flexible to the environment of the user.

Said client application ACOMI (2) is suitable for hosting contextual information or data provided by different sensors of the OMI in order to form a context C unique to an environmental situation of the user at a given time T.

During the configuration of the application ACOMI or automatically on installation, this application can define a set of information forming a public context transferable to another OMI, after having met the pairing conditions.

During the configuration, it is the user who will select via a human-machine interface the information that must be classified as public and those that will be classified as non-public, to store them in two different memories, the usage rules of which are defined differently in the application ACOMI program.

The sensors that can generate such contextual data can be chosen from among the following sources:
  motion sensors such as an accelerometer, a gyroscope, a magnetometer, an inclinometer,
  environment sensors such as a humidity or temperature sensor,
  proximity sensors such as a radar or sonar,
  sensors of position such as GPS/GALILEO, of geolocation, geofencing, detection of the proximity of an object of WiFi, or Bluetooth, or Beacon or NFC or RFID,
  GSM, WiFi, LIFI, Bluetooth, Beacon, NFC, WLAN, PAN network sensors
  sensors of biological data such as heart rate, arterial pressure, oximetry, brightness sensors,
touch-sensitive or physical pressure sensors, such as a touch-sensitive area, a keyboard,
imagine sensors such as a video camera, a camera,
audio sensors such as a mic,
time-based sensors such as a clock, a calendar,
any other sensors present on an OMI,
a mixture or an extrapolation of one or more of the elements above or any other information received from at least one sensor.

The context C is used to precisely define the environment of the user and to serve for the use of rules elaborated in connection with each different context to suggest to the user a certain number of third-party applications that may be useful to him. This suggestion results from the crossing by an appropriate engine between the context C and a set of rules R.

Preferably, the context C is formed at least by data relating to the geolocation coordinates, the presence of networks, the date and the time in combination with data coming from at least one of the following sensors:
an image sensor,
an audio sensor,
a pressure sensor,
a biological data sensor,
a brightness sensor,
a motion sensor,
an environmental sensor,
a proximity sensor
or at least one device indicated by the user, using for example a means of inputting on the OMI or by voice instruction on the OMI. By way of example, it may indicate that he is hungry, cold, hot, sleepy, or has a biological need etc.

As a consequence, the contextual data do not result only from location data, but from a set of data that also comprises the data coming from the profile (and therefore the tastes of the user), as well as that coming from other sensors (image, audio, pressure, biological data, brightness, motion, environment, proximity) or devices indicated by the user. Such data items make it possible to refine the suggestion much more finely than an application using only the data linked to the location of the user could do. By way of example, if the user specifies in his profile that he is a vegetarian, the client application will never suggest a meat restaurant even though the user goes past the meat restaurant several times a week at lunchtime.

The set of rules R is composed of at least one third-party application to be suggested and context elements, selected from among all the context information available, to define whether or not the suggestion should be triggered.

In an embodiment, the author/provider of a third-party application can create the rules R defining an optimum context C for the use of its application, and suggest it to the AS with the third-party application itself. Thus, the third-party application will be suggested according to the context chosen by its author.

In another embodiment, it is the use by a user of an application in a given context C that will define a new rule, or refine an existing rule in the ACOMI, then in the AS.

In an embodiment, the set of rules R is, preferably, centralized in an online database, in particular in the server application AS (3), and updated regularly on the client application ACOMI (2) on which the suggestion will be displayed. This connection is used to synchronize the rules between the server and the mobile of the user. Furthermore, preferably, according to the location or the context C of the user, the server can send a set of precise rules able to trigger a suggestion, thus avoiding the need to deploy all the rules on the mobile.

In an embodiment, the profile P corresponding to the characteristics and preferences of the user is added to the set of rules R. Such a profile can be composed of at least one of the following elements: age, address, nationality, sex, his tastes, subjects of interest of third-party applications such as "games, utilities, social, transport, bargains".

In an embodiment, the server application AS (3) can force the client application ACOMI (2) to suggest a third-party application that does not correspond to a context C or to a set of rules R or to the profile P of the user.

Operation of the System According to the Invention

When the user walks about or travels with his OMI equipped with the client application ACOMI (2), the client application ACOMI (2) collects the data from different sensors of the OMI in order to form an environmental context C.

By means of an appropriate engine, the context C is compared to a set of rules R previously received from the server application AS (3) and to the user profile P. If the context C meets the prerequisites of the rules, the client application ACOMI (2) notifies the user on his OMI that a third-party application could be useful to him. The user is then entitled to accept or refuse the suggestion. If he accepts it, the client application ACOMI (2) sets up a connection to the computer server to download and install, then launch said third-party application. Moreover, if the third-party application is already present on the OMI, the client application ACOMI (2) triggers the launching of the third-party application automatically or after approval by the user.

Preferably, the client application ACOMI (2) comprises a parameterization menu (5) illustrated by FIG. 1b, in which the user indicates by selecting on the screen of the OMI the preferred mode of connection (5a) (GSM, WiFi, LIFI, Bluetooth, Beacon, NFC, WLAN, PAN) as well as the levels of authentication (5b) (none, token, server call) and security (5c) (none, low, high, encryption) that he wishes to implement to set up the connection with the server in order to download and launch the third-party application.

In an embodiment and mode of implementation, when the server AS is in communication via the OMI with the application ACOMI it carries out the following actions:
General update of the application ACOMI,
Update of the set of rules R according to:
the contexts C previously encountered, in order to favor the triggering of a suggestion of a third-party application. By way of example, if the user enters the subway and no rule corresponds to this precise context, the server application AS (3) updates the set of rules so that the third-party application associated with the subway is suggested,
the evolution of the profile, which is modified by the user directly (change of his tastes) or indirectly (age).
Update of the profile P of the client application ACOMI (2), following statistical analysis of the use of the client application ACOMI (2).

Figure 2:
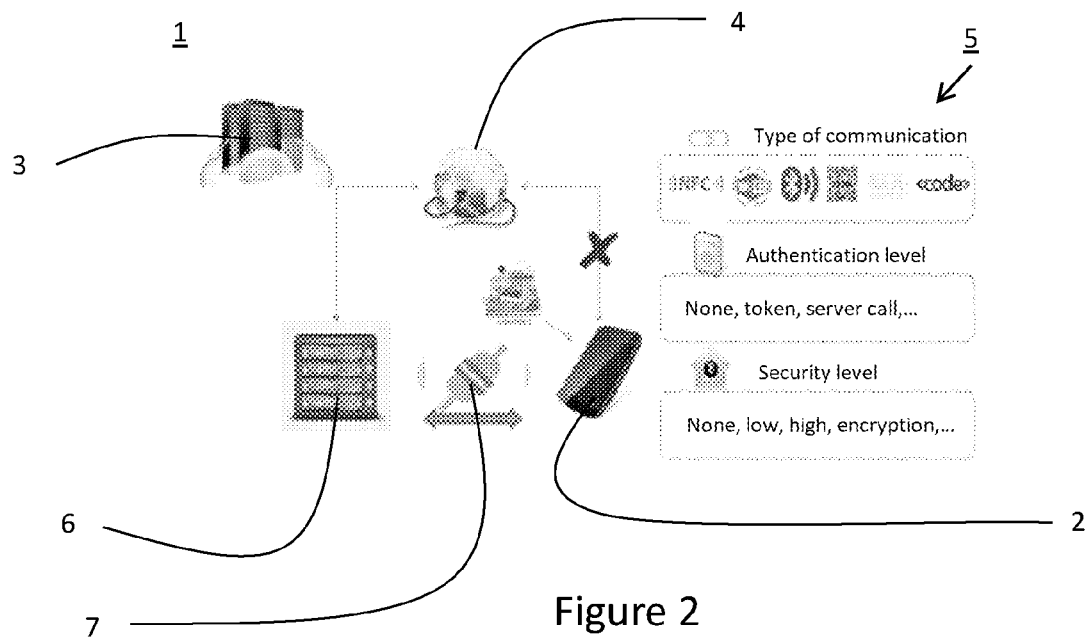
FIG. 2 represents the system according to the invention in a second operating mode when the client application ACOMI (2) cannot communicate with the server application AS (3) on a remote server, a pairing then being set up between the client application ACOMI (2) and a server application AS (3) on a local server by different means of connection, authentication and security.
Figure 3:
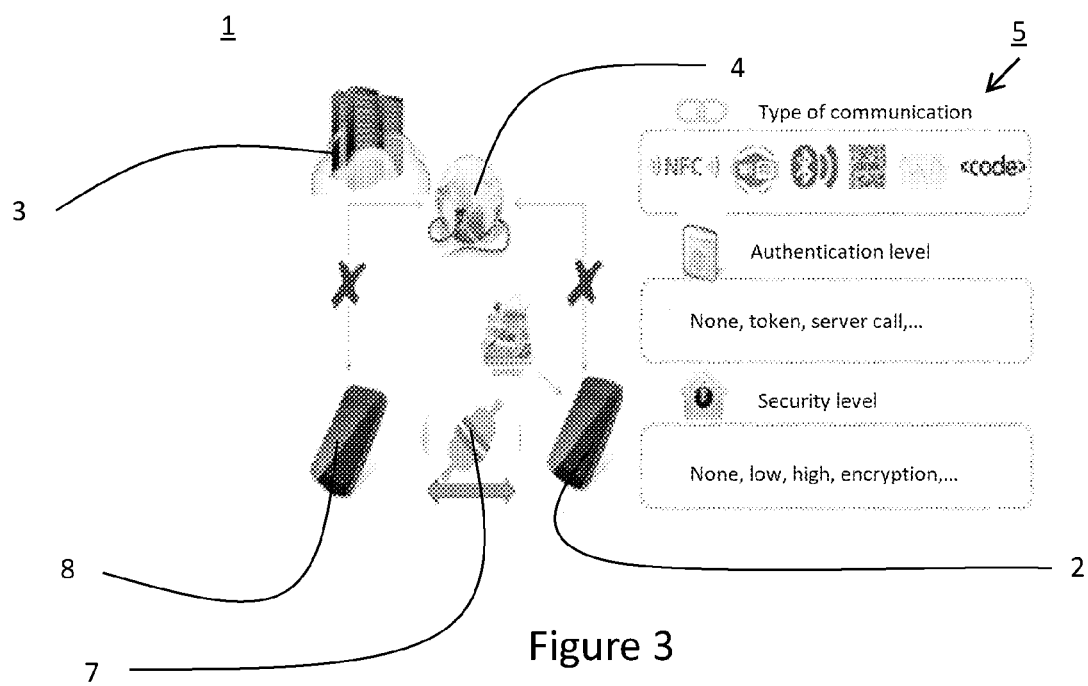
FIG. 3 represents the system according to the invention in a second operating method when the client application ACOMI (2) cannot communicate with the server application AS (3) on a remote server, a pairing then being set up between the client application ACOMI (2) and a second client application ACOMI (2) on another OMI by different means of connection, authentication and security in order to set up a Peer-to-Peer (P2P) link.

In an embodiment, when the connection between the client application ACOMI (2) on the OMI of the user (U1) and the server application AS (3) on the remote server is impossible, the client application ACOMI (2), after having attempted a connection on each means of communication defined as available by the user and observed the failure of each attempt, implements a program of search and connection (7) to an OMI of a second user (U2) having access to the client application ACOMI (8) or a local server (6) as illustrated by the FIGS. 2 and 3.

In this case the OMI of the user (U1) connects to all the nearby OMIs (8) or to a local server (6) not connected via Internet, at least one of which sends it the list of available applications and the associated rules. After having found on a nearby OMI (8) the application it is searching for, the first user OMI (U1) launches a procedure in order to pair (7) and download said third-party application according to a P2P protocol. Such a connection or pairing can be done by means of a NFC, WiFi, Bluetooth, radio, IR, QR code reader, or wired (USB, Ethernet) connection.

In an embodiment, a beacon based on the SSID of a WiFi, on Bluetooth BLE or on an RFID, can by itself form an environmental context that allows the suggestion and downloading as well as the launching of a third-party application. By way of purely illustrative and non-reductive example, this embodiment is particularly preferred in commerce. Specifically, the client application ACOMI (2) detects the beacon and suggests the downloading and launching of the commerce-related third-party application.

In an embodiment, a first client application ACOMI (2) comprises a context C suitable for being detected by a second client application ACOMI2 and which can trigger a suggestion in the second ACOMI2 application in the manner of a beacon.

In an alternative embodiment, the consent of the user, to download and launch the application, is not required.

In an alternative embodiment, the third-party applications can be replaced by notifications corresponding to information which can be useful to the user according to his context C. By way of purely illustrative and non-limiting example, such notifications can be promotional offers, advertisements, purchasing advice, or information relating to directions.

In another embodiment, when the present context C does not correspond to the set of rules R presently used by the client application ACOMI (2), but the present context C is identical to an earlier context C that resulted in the suggestion of a third-party application, said third-party application is automatically suggested without changing the set of rules R beforehand.

In another embodiment, the set of contexts C generated and the suggestions accepted by the user are sent to the server application AS (3), in order to analyze them to obtain statistical data making it possible to formulate new sets of rules which better correspond to the various environmental contexts usually encountered by the user.

In another embodiment, if the third-party application that must be suggested (according to the context C, the profile P and the rules R) is already present in the memory of the OMI and installed, the client application ACOMI automatically launches said application.

In another embodiment, the client application ACOMI and/or the server application AS anonymously analyze the acceptance of the suggestions and/or the use of the suggested third-party application, in order to refine the rules R and/or anonymously escalate to the developer of the third-party application the information that the application does not correspond to the needs of the user, and this in spite of the contextual suggested thereby. In other words, there is an escalation of anonymized information that then refines the set of general rules R provided by the providers of the third-party application.

On reading the present application it will be easily understood that the particularities of the present invention, as generally described and illustrated in the figures, can be arranged and designed in a great variety of different configurations. Thus, the description of the present invention and the attached figures are not intended to limit the scope of the invention but simply represent chosen embodiments.

Those skilled in the art will understand that the technical features of a given embodiment can in fact be combined with features of another embodiment unless the reverse is explicitly stated or it is obvious that the features are incompatible. In addition, the technical features described in a given embodiment can be isolated from the other features of this embodiment unless the reverse is explicitly stated.

It must be obvious for those skilled in the art that the present invention allows for embodiments in many other specific forms without departing from the field defined by the scope of the attached claims. They must be considered as illustrations and the invention must not be limited to the details given above.

The invention claimed is:

1. A system using a server comprising: a server application AS having at least a database containing third-party applications to be suggested and a hardware and software communication interface for automatically or semi-automatically downloading at least one application selected from the database to an intelligent mobile object including a client application ACOMI installed on the intelligent mobile object using rules R that can evolve or be modified, to process them by an appropriate engine of the client application ACOMI and arrive, by the use of contextual data coming from at least one sensor of the intelligent mobile object, at the recommendation of an application to be downloaded determined by the use of contextual information, the contextual data defining a profile P and a context C, the ACOMI client application automatically or semi-automatically triggering the remote or proximity downloading and/or the automatic launching of the recommended application by the use of a connection with a remote intelligent mobile object according to the availabilities of the networks in proximity to the intelligent mobile object OMI and the preferred connection parameters previously stored by the user, either in the server or in the intelligent mobile communicating object and/or comprising parameters defining the level of security of the connection, wherein when the connection between the client application ACOMI on the intelligent mobile object of the user and the server application AS on the remote server is impossible, the client application ACOMI, after having attempted a connection on each communication network defined as available by the user and observed the failure of each attempt, implements a program of search and connection to an intelligent mobile object of a second user (U2) having access to the client application ACOMI (8) or a local server, at least one of which sends the client application ACOMI the list of available applications and the associated rules, and wherein the context C is formed at least by data relating to the geolocation coordinates, the presence of networks, the date and the time, in combination with data coming from at least one of the following sensors: an image sensor, an audio sensor, a pressure sensor, a biological data sensor, a brightness sensor, a motion sensor, an environmental sensor, a proximity sensor or at least one desire indicated by the user.

2. The system using a server comprising at least one database containing third-party applications to be suggested and a hardware and software communication interface for automatically and semi-automatically downloading at least an application selected from the database to an intelligent mobile object according to claim 1, wherein the processing of the context information sent by each intelligent mobile object allows the elaboration of rules R that can evolve or be modified, each rule enabling the contribution to the recommendation of an application to be recommended among the applications of the database according to the data coming from the context C.

3. The system using a server comprising at least one database containing third-party applications to be suggested and a hardware and software communication interface for automatically and semi-automatically downloading at least an application selected from the database to an intelligent mobile object according to claim 2, wherein the elaboration is carried out on the intelligent mobile object.

4. The system using a server comprising at least one database containing third-party applications to be suggested and a hardware and software communication interface for automatically and semi-automatically downloading at least an application selected from the database to an intelligent mobile object OMI according to claim 2, wherein the rules for sensing context are updated in the application ACOMI of the mobile from the application AS of the server by sending messages, and can therefore evolve.

5. The system using a server comprising at least one database containing third-party applications to be suggested and a hardware and software communication arrangement for automatically and semi-automatically downloading at least an application selected from the database to an intelligent mobile object according to claim 1, wherein the elaboration is carried out on the server.

6. An intelligent mobile object for use in a system according to claim 1, wherein the event of the user choosing automatic downloading and after generation by the intelligent mobile object of the suggestion, the client application ACOMI, after verifying the condition, sends an acceptance message to the server AS containing the recommended application and the downloading is initialized and carried out by the server.

7. The intelligent mobile object according to claim 6, wherein the event of the user choosing semi-automatic downloading, after generation of the suggestion by the intelligent mobile object, the client application ACOMI, after reading the condition, diverts its program to a sequence causing the display of a window, icon or box asking the user to agree to the downloading, the user selects a reply on his intelligent mobile object by a human-machine interface, and the client application ACOMI of the intelligent mobile object, according to the reply, generates the message adapted to the reply to send the message to the server AS containing the recommended application and which reacts in accordance with the reply by sending or not sending the suggested application to the telephone of the user.

8. The intelligent mobile object, according to claim 6, the client application ACOMI comprises a parameterization mechanism allowing the user, on starting the client application ACOMI or by accessing the menu of the application, to choose and activate the network or the type of communication usable to communicate with the server or another intelligent mobile object to carry out data crossing.

9. The intelligent mobile object, according to claim 6, the client application ACOMI comprises a parameterization mechanism allowing the user, on starting the client application ACOMI or by accessing the menu of the application, to choose the security level usable to communicate with the server or another intelligent mobile object to carry out data crossing.

10. The intelligent mobile object, according to claim 6, the client application ACOMI comprises a parameterization mechanism allowing the user, on starting the client application ACOMI or by accessing the menu of the application, to choose a condition of automatic or semi-automatic downloading or crossing and its storage in the memory of the application.

11. The intelligent mobile object, according to claim 6, the information collected and forming the context C comes from different sources such as: either at least one motion sensor, or at least one environment sensor, or at least one mobile network subsystem, or at least one WLAN subsystem, or at least one PAN subsystem, or at least one LAN subsystem, or at least one of the following networks: a GSM, WiFi, Bluetooth, NFC, radio, LIFI or Ethernet network, or a mixture or an extrapolation of one or more of these sources above.

12. The intelligent mobile object, according to claim 6, the environment sensor generating the information collected and forming the context C is formed at least by:
  motion sensors such as an accelerometer, a gyroscope, a magnetometer, an inclinometer, and/or
  environment sensors such as a humidity or temperature sensor, and/or
  proximity sensors such as a radar or sonar, and/or
  sensors of position such as GPS/GALILEO, of geolocation, geofencing, detection of the proximity of an object of WiFi, or Bluetooth, or Beacon or NFC or RFID, and/or
  GSM, WiFi, LIFI, Bluetooth, Beacon, NFC, WLAN, PAN network sensors, and/or
  sensors of biological data such as heart rate, arterial pressure, oximetry, and/or
  brightness sensors, and/or
  touch-sensitive or physical pressure sensors, such as a touch-sensitive area, a keyboard, and/or
  imagine sensors such as a video camera, a camera, and/or
  audio sensors such as a mic, and/or
  time-based sensors such as a clock, a calendar, and/or
  any other sensors present on an OMI, and/or
  a mixture or an extrapolation of one or more of the elements above or any other information received from at least one sensor.

13. The intelligent mobile object, according to claim 6, the information collected and forming the context C is associated with a profile P containing data representing the preferences of the user, or its trends, along with data coming from other context sources such as the calendar or connected objects.

14. The intelligent mobile object, according to claim 6, the client application ACOMI includes a parameterization menu allowing the user to choose one or more types of application categories or one or more types of specific applications that the user accepts or refuses by selecting an acceptance or refusal reply in the display of categories, for at least one of the following categories: games, utilities, social, transport, bargains.

15. The intelligent mobile object, according to claim 6, the downloading or the crossing each implements a procedure of pairing, selecting of the connection type, authentication according to an authentication level determined by the user during parameterization and transfer according to the security level chosen.

16. The intelligent mobile object, according to claim 6, when the reply following a message sent to the server is not available, the communication module sets up a connection with a second local, intelligent mobile object comprising the client application and the third-party application corresponding to the environmental context in order to download and then launch said third-party application.

17. The intelligent mobile object, according to claim 12, the information collected and forming the context C is associated with a unique identifier creating a bijection between the context and the user or the mobile.

* * * * *